US 9,509,825 B2

(12) United States Patent
Leow

(10) Patent No.: US 9,509,825 B2
(45) Date of Patent: Nov. 29, 2016

(54) SYSTEM AND METHOD OF SECURE PERSONAL IDENTIFICATION

(71) Applicant: Chon Hock Leow, Menlo Park, CA (US)

(72) Inventor: Chon Hock Leow, Menlo Park, CA (US)

( * ) Notice: Subject to any disclaimer, the term of this patent is extended or adjusted under 35 U.S.C. 154(b) by 0 days.

(21) Appl. No.: 14/961,876

(22) Filed: Dec. 7, 2015

(65) Prior Publication Data

US 2016/0165036 A1    Jun. 9, 2016

Related U.S. Application Data

(60) Provisional application No. 62/088,685, filed on Dec. 7, 2014.

(51) Int. Cl.
| | |
|---|---|
| H04M 1/66 | (2006.01) |
| H04M 1/68 | (2006.01) |
| H04M 3/16 | (2006.01) |
| H04M 1/725 | (2006.01) |
| H04B 1/3827 | (2015.01) |
| H04L 29/06 | (2006.01) |
| H04L 29/08 | (2006.01) |
| H04W 12/06 | (2009.01) |

(52) U.S. Cl.
CPC ......... *H04M 1/72527* (2013.01); *H04B 1/385* (2013.01); *H04L 63/0442* (2013.01); *H04L 63/0861* (2013.01); *H04L 67/306* (2013.01); *H04W 12/06* (2013.01)

(58) Field of Classification Search
CPC ... H04W 12/06; H04W 12/12; H04W 12/08; H04W 88/02; H04W 24/02; H04L 63/06; H04L 63/0861; H04L 67/306; H04L 63/0442
USPC .............. 455/41.1–41.3, 410, 411, 418–420, 455/422, 432.2, 432.3, 557, 558; 713/172
See application file for complete search history.

(56) References Cited

U.S. PATENT DOCUMENTS

| | | | |
|---|---|---|---|
| 2006/0206709 A1* | 9/2006 | Labrou | G06Q 20/18 713/167 |
| 2012/0172089 A1* | 7/2012 | Bae | H04L 63/067 455/558 |
| 2013/0012168 A1* | 1/2013 | Rajadurai | H04L 9/0822 455/411 |
| 2015/0072618 A1* | 3/2015 | Granbery | H04W 4/008 455/41.2 |
| 2015/0334107 A1* | 11/2015 | Chastain | H04L 63/0807 713/172 |

* cited by examiner

*Primary Examiner* — Nhan Le
(74) *Attorney, Agent, or Firm* — John C. Merchant

(57) ABSTRACT

A system and method for securely and automatically identifying users to an inquirer for purposes of obtaining user identifying information is described. The system consisting of at least one client device associated with a user, at least one inquiring device associated with a host, a client information server and a network. The system and method allows computer based systems to automatically authenticate the identities of a plurality of users entering a physical space and obtain information pertaining to user preferences. Users may control whether identifying information is provided to an inquirer as well as what preference information may be obtained by an inquirer.

10 Claims, 6 Drawing Sheets

SYSTEM AND METHOD OF SECURE PERSONAL IDENTIFICATION

CROSS-REFERENCE TO RELATED APPLICATION

The present non-provisional application claims the benefit of a commonly assigned provisional application having Ser. No. 62/088,685, filed on Dec. 7, 2014 and entitled SYSTEM AND METHOD OF SECURE PERSONAL IDENTIFICATION, which application is incorporated herein by reference in its entirety.

BACKGROUND OF INVENTION

1. Field of the Invention

Embodiments consistent with the principles of the invention relate to mobile computerized devices and applications for securely obtaining identifying information and preferences of users.

2. Discussion of the State of the Art

Proof of identity is an important part of online life. Most online services require log-in names and passwords to confirm a user's identify, but such methods are known to provide only weak security benefits and are inconvenient for the user. Secure passwords are hard to remember and take time to enter. As a result, weak passwords are normally chosen. A system and method that increases the security of online transactions, while reducing inconvenience to the user, would be beneficial.

Credit card purchases are a common form transaction requiring the confirmation of the consumer's identity. In present systems and methods used to make credit card purchases, the physical card and a number memorized by the card's owner represents the standard security requirement of something owned (the card) and something known (the number), making theft more difficult. But there are significant security risks associated with these systems and methods. For example, numbers are relatively easy to observe by others as they are entered via a key pad and physical cards can be cloned. Online transactions are even more susceptible to security issues because they rely on the credit card number without physical proof of ownership of the card. Hence, a system and method that increases the security of credit card transactions is beneficial to the purchaser, the seller and the card provider.

There is a growing expectation that online convenience will merge with real life such that the needs and preferences of the consumer will be known to authorized persons or service providers without having to be continually re-stated. Why shouldn't a restaurant know you are vegetarian or allergic to peanuts? Why shouldn't a clothes shop know your size and favorite color? But it is not practical to ask a customer to log-in each time they walk into a shop as they might do for a website. Hence, a system and method for automatically providing user based information options and preferences would be beneficial to both the customer and the service provider.

There are other important government functions requiring secure and convenient identification of persons. For example, governing authorities often have a legitimate need to identify and obtain information about their citizens to determine eligibility of such persons to drive or access government services. Vendors having authority to sell age-restricted goods or services (such as alcohol, or access to bars) need an efficient mechanism to identify customers below the age requirement for the goods and services they are purchasing. But the process for checking proof of eligibility is often time consuming, expensive, and inconvenient.

A system and method providing for secure and convenient identification of individuals as well as providing information for determining the eligibility and preferences of individual for certain privileges or services would be beneficial to individuals as well as to service providers and authorizing entities.

SUMMARY OF THE INVENTION

A system and method for securely and automatically identifying users to an inquirer for purposes of obtaining identifying information is described. The system and method allows computer based systems to automatically authenticate the identities of a plurality of users entering a physical space and obtain information pertaining to user preferences. Users may control whether identifying information is provided to an inquirer as well as what preference information may be obtained by an inquirer.

Through the system and method described herein, users may effectively and automatically "log-in" to a physical space and provide preference information to assist the inquirer in changing settings or otherwise maximizing the experience of the user according to the user preferences. The system may include a wearable secure client device (such as a watch or phone) having its own unique identification code that communicates with an inquiring device (such as a network enabled computer or check out kiosk) located in a physical space (such as a shop, café or hotel) which in turn communicates via network with a remote server to obtain the user's authenticating information and preferences. The user declares his/her identity using the secure client device to the inquirer, the inquirer communicates with the server to confirm the identity of the user, the server authenticates the user's identify and provides information to the inquirer as well as any devices, systems, or persons in the physical space which information may be used to make the user's experience better. The system and method described herein allows users to, in effect, carry their profile, preferences, and web browser cookies with them and automatically provide them as desired to obtain access to services and to enhance their experience.

The inventive system and method provides novel means for:

1. Creating a 3-way discussion between the user, the server and the place that wants to know the user's identity and preferences. The prior art provides for only a 2-way discussion between user and server.
2. Providing the user with control over what information is made available to the inquirer. The user may opt to have the system automatically (through biometric identification for example) confirm user identity and provide specific desires and preferences depending on the identity or type of inquirer. For example, the user may opt to identify him/herself as a vegetarian so that a café can offer him/her a suitable selection; or the user opt to allow preferences regarding music ("I like Mozart") so a shop can choose suitable mood music.
3. Using a user's known associates (i.e the user's "friends" or those otherwise associated with the user through profile, connections, proximity, or other learned information) to increase the confidence in the user's identity. This is rooted in the concept that if persons known to the user are physically close, the information provided by the user is more likely authentic or truthful.
4. Allowing for capture and processing of biometric information (such as face detection) to increase confidence in the user's identity. The system may constantly update user biometrics; transferring biometrics from the server to the shop's point-of-sale terminal so that users may be picked out of crowd and addressed personally.
5. Using the user device (or application) as explicit permission by the user to be identified; the user may opt not to provide permission.

BRIEF DESCRIPTION OF THE DRAWING FIGURES

DETAILED DESCRIPTION

The inventor provides a unique security system and at least one method of operation thereof that may determine the identity of individuals in a public or private (membership) space and retrieve according to permissions, previously stored preferences and other information including profile information about those identified individuals. The preference information and other information retrieved may be used to improve the customer experience. The present invention is described in enabling detail using the following examples, which may describe more than one relevant embodiment falling within the scope of the present invention.

Figure 1:
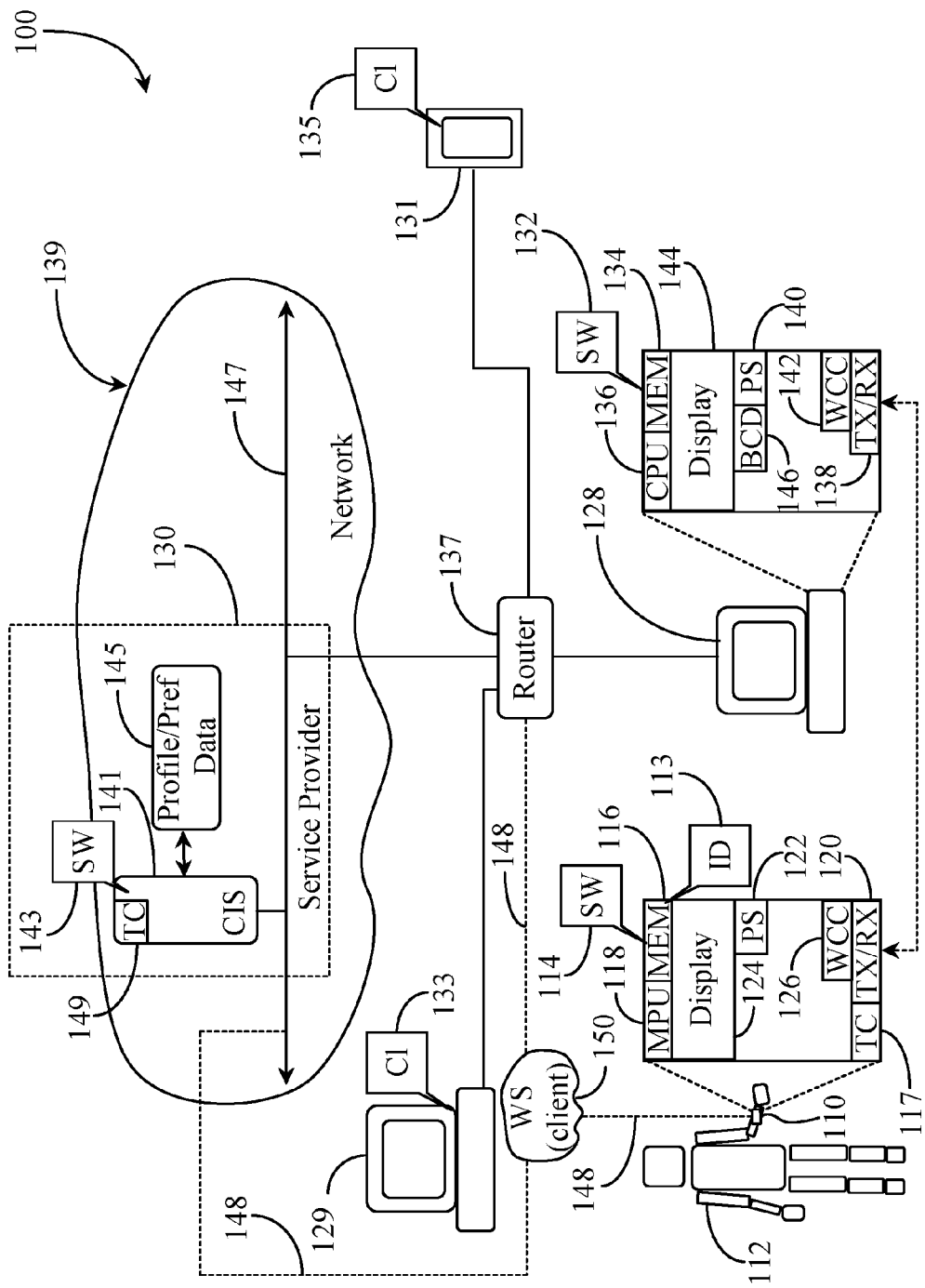
FIG. 1 represents an embodiment of a security system for identifying a user to an inquirer consistent with the principles of the invention.

FIG. 1: The System Architecture:

FIG. 1 is an architectural overview of a communications network 100 supporting a secure identification and information retrieval system according to an embodiment of the present invention. Network 100 indudes a client/server network 139, which may be an Internet network or another wide area network (WAN) such as a corporate WAN or municipal area network (MAN). In one embodiment network 139 may be a local area network (LAN) without departing from the spirit and scope of the present invention.

In this example, network 139 represents the well-known Internet network and may hereinafter be referred to in this specification as Internet 139. Internet 139 includes a network backbone 147 that represents all of the lines equipment and access points that make up the Internet network as a whole. Therefore there are no geographic limits to the practice of the present invention. A service provider domain 130 is illustrated herein (broken rectangle). Service provider 130 provides a service that enables operators of a publicly available venue such as a store, restaurant, or other patronized venue to make identification of arriving users (i.e. those in close proximity with the venue) that are registered with the provided service and to retrieve, upon successful identification, other information such as profile and preference data about the identified users to aid in improving the experience of those users in interaction with the venue. In other embodiments, the service provider may enable privately available venues (clubs or other private venues) to verify the identities of persons wishing to enter the venue or to receive services (such as government services) which are available to only certain authorized persons. For example, the present system could be used to determine the authorization of persons to enter a private area, to cross political borders, or to be allowed privileges (such as, for example, to drive a car or purchase controlled products such as alcohol) based on the identification and other data about the user (such as citizenship, age, license, etc.).

Service provider 130 includes in this example, at least one customer information server (CIS) 141 (referred to hereafter as "CIS" or "server") having connection to network backbone 147. CIS 141 may represent both a user registration point for services as well as an information server that may serve information about identified users upon request by a network-connected device or system. In actual practice there may be more than one server such as the illustrated CIS 141. Such servers may be distributed over a large geographic area on the network servicing participating venues Moreover, such servers may be assigned or dedicated to service a portion of an overall user base or to perform a portion of an overall service process without departing from the spirit and scope of the present invention. Likewise, a server providing access to a Website, for example, as a point of user registration may be dedicated and may be separate from a server that performs user identification and retrieves information on behalf of a user.

CIS 141 includes an instance of software 143 that may be adapted to provide user service registration and may be adapted to aid in identification and information retrieval in accordance with practice of the present invention. CIS 141 has connection to a data repository 145. Data repository 145 may contain information about users registered with the service which is provided by the users themselves as well as information about users registered with the service which is obtained by the server from third parties and or gathered by the server's detection and analysis of user contact with the system. Such information may collectively be referred to as "identity data". Typical types of user profile and preference information may include user name, age, address, gender description, family members, choices regarding inquiring devices or hosts that the user wishes to provide or deny information to, and general preferences regarding music, literature, food and sport. Typical types of user identification information may include passwords, biometric information such as photographs or fingerprints, retinal scans, voice recordings, handwriting and the like. User information collected about the user by the system may include dates and times when the user has interacted with the server either by logging in or by an associated client device being detected by an inquirer (which may include date, time, and location data). Such user information collected by the system may include information about the user obtained from third party websites (such as connections through social media such as Facebook, LinkedIn and other sites). Such information may also include information gathered by the server from other web sources such as publications, reviews or other data recorded on third party servers. Personal data may even include private information (such as medical information) which is provided by third party services through permissions provided by the user in the user preferences. In addition to information about individual users, CIS 141 may keep and maintain secure identity information pertaining to such users in order to practice the invention in a secure manner over the network In some embodiments, the system may track user contact with the system including data associated with inquirer detection of a user's client device regardless of whether the client device allows a token to be sent to the server. In some embodiments, the user may control when the client device may be detected by an inquiring device and or when it responds to inquiring device by activating the client device by means of a button or other interface. While this would require an explicit action by the user (i.e. activating the client device), it may be beneficial if the user does not wish the system to track the users whereabouts by simply detecting and recording when a client device becomes proximate to an inquiring device. The mechanism that enables the client device may keep it active for a predetermined period during which it can respond to inquiries from inquiring devices. However, the user may, by selecting appropriate preferences with the server change the period or activity (i.e. date/time/location when the client device is active) and or elect to allow the client device to provide user profile, preference and or identifying information to some or all inquiring devices including but not limited to profile information, general preferences, identity information, payment information and other information making up user identification information (or user data).

User 112 may register for service by connecting directly to CIS 141 through a secure Website using a network capable computing device that may be the client device or a device that may connect to the client device for the purpose of loading or offloading information. In this example, client device 110 has a direct connection 148 to CIS 141 through a wireless service (WS) 150 and router 137 functioning as an information hub or router on premises. In this way a user may access CIS 141 while on site to activate service or to re-authenticate service due to error or security risk.

It is duly noted herein that a user may also connect to CIS 141 through other means off premise (venue) such as through a home network or from other locations independent of the architecture of FIG. 1 to register and perform original token processing with the server. In any case where the client device is dedicated and not capable of Web navigation, the user may connect with any network capable device that may transfer data to the client device such as a USB port, wireless interface, or cabled transfer without departing from the spirit and scope of the present invention. In some embodiments, the client device may itself be capable of Web connectivity and navigation such as, for example, when the client device is a mobile computing device such as a smartphone, tablet or other mobile network communication device having interface and network communication capability.

Communications network 100 includes at least one network-capable device or system 128 (referred to hereafter as an inquiring device). Inquiring device 128 is a computing device and may be, for purposes of this example, a point of sale system like a customer service or check out register in a public or, in one embodiment, a private venue. A venue may be any enterprise, business, organization or establishment having reason to identify persons (i.e. users) on site and retrieve data about such users that may be helpful in improving service to those users. In this specification users may be referred to in the drawings as "clients" (distinguishable from the client devices with they are associated with for purposes of establishing identity and providing preferences through the system). Inquiring device 128 has connection to a network router 137 that is in turn connected to backbone 147 in network 139.

An inquiring device 128 (in addition to having other capabilities and performing other tasks) has a function of detecting other wirelessly-enabled devices via wireless presence confirmation on a network or other wireless channel or communications range and at least making requests for communication to those detected devices to establish wireless connections for the purpose of obtaining identification credentials from those detected devices. In a preferred embodiment the identity credentials comprise an identity token previously created in a process involving CIS 141 and a user 112 (or "client") operating a client device 110 that will later be detected by an inquiring device 128 wherein the inquiring device may ask for the token to validate identity.

An inquiring device 128 includes minimally required components (expanded out for purpose of illustration) to enable practice of the present invention including a computer processing unit (CPU) 136 and a resident memory (MEM) 134. An inquiring device 128 includes a display 144, a power supply 140, a wireless carrier card or chip (WCC) 142, and transmit and receive circuitry (TX/RX) 138 for purposes of wireless communications capability. Wireless communications capability may include Bluetooth™ technology, Wireless Fidelity (WiFi), near field communication (NFC), Wireless Universal Serial Bus (WUSB), or other wireless communications technologies including infrared (IF) detection without departing from the spirit and scope of the present invention. Inquiring device 128 may include a biometric capture device (BCD) 146 such as a fingerprint scanner, a still or video camera, a voice recorder, an eye scanning device, etc.

An inquiring device 128 includes a software (SW) instance 132 loaded from memory. SW 132 includes a function for detecting other devices in wireless communications range. Such other devices may include a client device 110 that might be worn, in one embodiment, by a person owning the device such as user 112. In this example a client device 110 may be a smart watch, worn on the user's wrist. In another embodiment, a client device 110 may be a mobile communications device such as a smart phone, a smart card, or another form of wearable or portable communications device. A client device 110 is wirelessly enabled and may be wirelessly detected by an inquiring device 128 provided the client device 110 is operating and wireless communication capability is activated at the time.

A client device 110 includes minimally required components (expanded in FIG. 1 for purpose of illustration) in order to practice the present invention including a micro processing unit (MPU) 118 and a resident memory (MEM) 116. The client device 110 also has a client device clock (or timer) 117, which the client or server may reset such as if a client needs to re-authenticate to the server. A client device 110 may or may not include a display 124 or user interface capability (not shown) such as buttons or switches to control enable physical input on the client device itself by the user. The client device 110 includes a power supply (PS) 122, a wireless communications chip or card (WCC) 126, and transmit/receive (TX/RX) circuitry 120 for purposes of wireless communication capability. Again, wireless communications capability may include Bluetooth™ technology, Wireless Fidelity (WiFi), near field communication (NFC), Wireless Universal Serial Bus (WUSB), or other wireless communications technologies including infrared (IF) detection without departing from the spirit and scope of the present invention.

The client device 110 includes a software (SW) instance 114 loaded from memory. SW 116 includes a function for encrypting a unique identity token representing the identity of the user associated with (i.e. owning and wearing) the client device without compromising the real user identity. Such identity is represented herein by an identification token file (ID) 113. In one embodiment, token 113 is stored in encrypted format in MEM 116 on the client device 110. When user 112 wearing or carrying an associated client device 110 comes within wireless communications range of inquiring device 128, inquiring device 128 may detect the client device 110 and request authorization (identity) from the client device. Such identity is represented to the server via the inquiring device in the form of encrypted identity token.

In this embodiment the inquiring device 128 detects the client device 110 and requests identity (i.e. an identity token 113) from the client device 110. The client device 110 may send the identity token 113 to the inquiring device 128 over the wireless channel or connection, illustrated herein by a broken directional arrow between TX/RX components of the two interacting devices. Once the inquiring device 128 receives an identity file such as an identity token 113 from client device 110, it may upload the token 113 to server 141 for validation purposes to confirm the identity of the user 112 of client device 110 and obtain use preferences and other information about the user 112.

It will be apparent to one with skill in the art of wireless communications and data syncing that detection and communication may happen on an ongoing basis with multiple registered client devices each associated with a separate user on site being detected wirelessly by the same inquiring device. It will also be apparent to the skilled artisan that the same inquiring device may "gather" identity tokens from such client devices in concert and may upload gathered identity tokens singly or in batches to one or more servers 141 for identity validation without departing from the spirit and scope of the present invention.

In this embodiment, there are illustrated additional devices on site (venue) and proximal to the user 112 such as a point of sale (POS) device 129 and a mobile communications device 131. A POS device or system 129 may or may not be identically equipped relative to an inquiring device 128. For example, in a store having more than one entrance, there may be inquiring devices aided by SW resident in multiple locations (such as near entrances or service desks manned by sales persons or others collectively referred to hereafter as customer service representatives".

In a preferred embodiment it is important to identify users when they arrive at the venue and before they have shopped and are ready for checkout (store example). This is because of a function of CIS 141 in retrieving and returning preference and or profile data and perhaps other information about the identified users to the inquiring device. The user 112 gives specific permission in one embodiment over which data may be retrieved from storage and shared with venue operators (i.e. individuals or organizations associated with the inquiring devices). This may be configured earlier during user subscription and registration for the service. In a store situation, the allowed preference data to be released for an identified user 112 may include information such as product wishes, past purchases, interests identified by recording the user's 112 Web browsing behavior including gathering of recent Web cookies (store domain sites), profile data including gender, age, general interests, etc. Such data may be contained in repository 145 connected to server 141 and may be served (push data from) to the inquiring device 128 at the time of user identity confirmation or any time thereafter. In one embodiment the inquiring device may be authorized by the server upon successful validation of a client token to access (pull data from) stored information held by the server or by another server or servers.

The inquiring device 128 may use the received information to help improve the user's experience in a variety of ways in addition to securely identifying a user for service including transactions made. The information may also be relayed or transferred from an original inquiring device to other designated end points or terminals in the venue for compartmental assistance such as in a department or sector of a larger venue.

One with skill in the art will recognize that a security token environment may take one of many available schemes regarding encryption, decryption, and resident and transmitted encryption and decryption keys. There is a constant risk of token security breach attempts or attacks that may occur with the purpose of impersonating a client device and attempting to steal identity information such as user personal information number (PIN) or client identification code by stealing private decryption key files and like attempts to usurp the secure exchange between devices on the network. Therefore, in addition to an identity token encryption and decryption process there may be additional security measures that might be practiced at or by an inquiring device such as device 128. One such measure may include provision of a biometric capture device (BCD) such as BCD 146 and supporting software on inquiring device 128. BCD may comprise a finger print scanner, a voice recognition interface, an optics recognition interface (video camera), or the like. It should be noted herein that a BCD is not specifically required in order to practice the present invention.

In a preferred embodiment, a user 112 carrying or wearing a client device 110 may come into required proximity of the inquiring device 128 with the client device 110 powered on including the wireless communications option used to detect and pass tokens 113. The inquiring device 128 detects and requests an identity token 113 from the client device. In one embodiment the inquiring device 128 may detect the client device 110 and grab the identity token 113 from the client device 110 in one session. In another embodiment the inquiring device 128 may obtain the identity token 113 from the client device 110 using a multi-step process.

The identity token 113 passed from the client device 110 to the inquiring device is encrypted and the inquiring device 128 is unable to decrypt the token 113 as the inquiring device 128 operates as a communications intermediary or proxy. Therefore the token received is uploaded by inquiring device 128 to CIS (the "server") 141 that is aided by SW 143. The server has a server clock 149 in which to determine the time in which the token was received at the server. The server 141 may decrypt the token to an extent that it may match components of the token to the token components that the server has in storage relative to that client device (those token components being created previously during the registration process). It should be mentioned herein that the identity information may be held separately by the server (not in same database) but associated with a user profile and preference data without departing from the spirit and scope of the present invention.

Once CIS 141 confirms the identity of the client device 110 by matching the security data, it may send notification thereof back to inquiring device 128. At this point the inquiring device 128 may also have been served some additional information that the user 112 has previously given permission to share relative to the instant venue description so that the preference and other data served may be relevant to what the user 112 is endeavoring to accomplish at the venue site. It should be noted for purposes of this description that in one embodiment the server 141 may confirm the identities of both the client device 110 (through authentication of the transferred identity token) as well as the user 112 associated with the client device 110 (through biometric information captured and transferred to the server by the inquiring device 128). In other embodiments, only the identity of the client device 110 associated with the user is authenticated through matching of the identity token received from the client device 110 through the inquiring device 128 with identify information stored by the server 141.

In one embodiment, the inquiring device 128 may pull preference data and other client information from the CIS 141 and then pass all of or parts of the information to other local devices such as to POS device 129 or to mobile communications device 131. SW (software) clients (CI) on these devices indude CI SW 133 and CI SW 135 respectively. These SW clients (or applications) may be limited to enabling devices 129 and 131 to receive pertinent information about a user who has been successfully identified by the server through an inquiring device 128. Such users 112 may in fact be in a desired venue department or in route to desired department (such as the clothing department of a large department store) lending to a transfer of the data from the inquiring device 128 to another local destination device like POS device 129 located in the desired department. In one embodiment, a live customer service assistant may ask a user who is being identified which area, department, or sector of the venue they will be patronizing and in some case what types of products they might be coming in to look at (store example) and direct (using other devices connected by network with the inquiring device 128) information to devices located in relevant departments.

In the case of mobile communications device 131 aided by CI SW 135, the inquiring device (128) may forward data to the mobile device 131 in order to help assist an identified user 112 who may be in the nearest proximity to the service representative (sales, support) carrying the mobile device 131. In one example, a user shops for dresses and the preference information describes types of dresses or brands that interest the user. In this simple example the user's experience may be enhanced by the service representative's knowledge of the user preferences concerning "dresses" without having to interview the user. The service representative may even gather a few dresses for the user to view before the user actually steps into the department based on the information received by the inquiring device 128 and forwarded to device 131 (service representative's device) for example.

In other examples, inquiring devices may detect the presence and obtain identifying information relating to multiple users with a particular location in the venue and use that information to make choices about appropriate user environment (for example, play music which is preferred by a majority of the identified users shopping in a particular location of the store). In other examples, inquiring devices may detect and forward identifying information of multiple users who are known by the server to be associated with one another. For example, it may be known to the server (based on the identifying information accessed by the server pertaining to the multiple detected users) that one or more users are known to one another or are likely to appear in the same location at the same time. This information can be used by the server to increase the confidence of the identity of users based on their known likelihood to be present with other identified users as certain times or in certain locations. For example, it may be known by the identifying information stored at the server that certain users are known to shop with one another on certain dates and times. Detection of such associated users may be used by the server to determine the identity of one or both of the associated users. Further description and expansion of this aspect of the invention will be provided in the examples and methods below.

Figure 2:
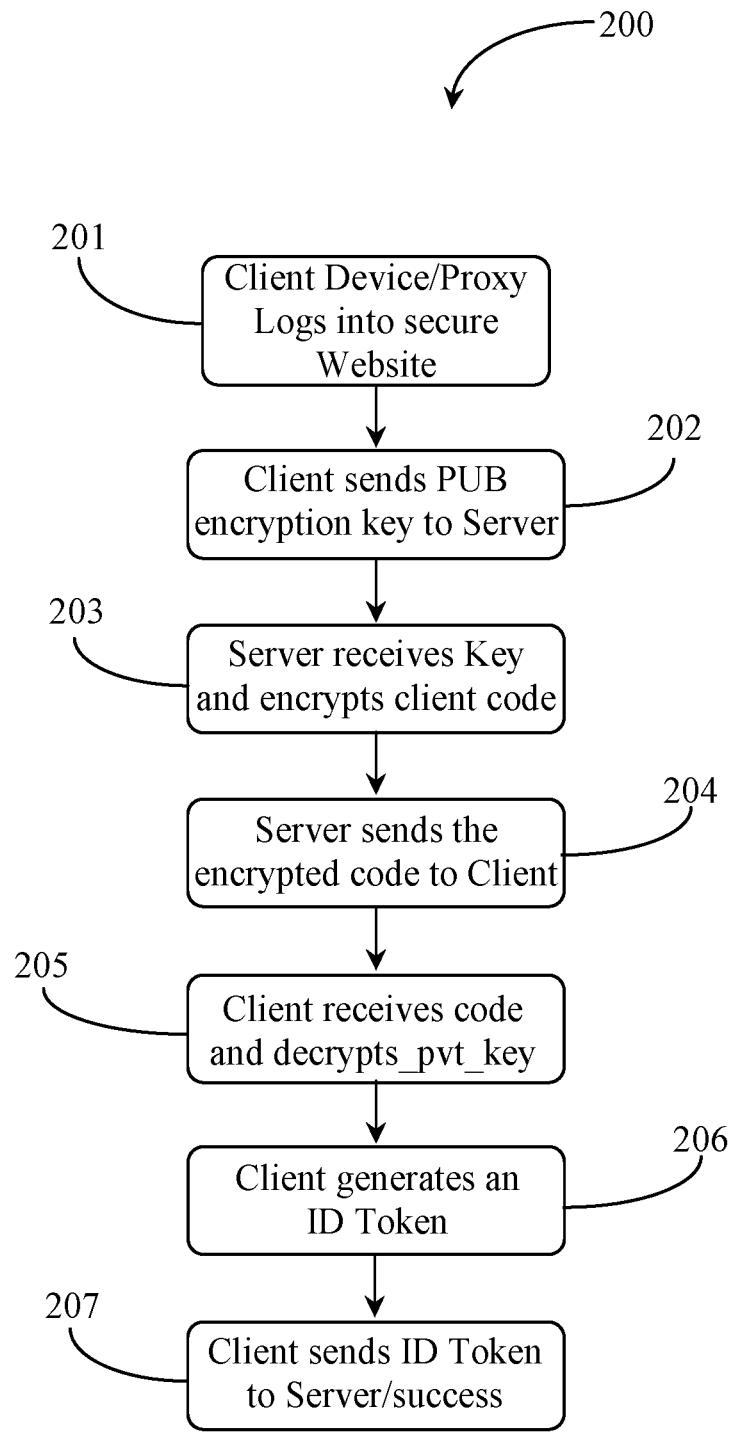
FIG. 2 is a flow diagram of an example process for authenticating the client device with the server using a system consistent with the principles of the present invention.

FIG. 2: An Example Process for Initial Authentication of the Client Device with the Server:

FIG. 2 is a process flow chart 200 depicting steps for generating an identity token at the client device 110 and sending it to the server 141 before the user's first use of the service at a venue. At step 201 the user (referred to in FIG. 2 as the "client") logs into a secure server 141 (referred to in FIG. 2 as "Website") via the client device or a proxy device that may transfer data to and from the client device. In this step the user logs in to the CIS using credentials established during registration at the Website during the same or in a previous session. The server hosting the Website may be the same server or a different server than server 141 described in FIG. 1. If the Website is hosted on a different server then the Web server acts as a proxy to the CIS server.

At step 202 the client device or a proxy sends a public encryption key (half of pair) to the server. The server receives the public key and uses it to encrypt a client code. The encrypted client code is sent to the client device directly or through a proxy device at step 204. In step 205, the client device receives the encrypted client code and decrypts the code using its private decryption key. The client device then generates an ID token in step 206. The client device sends the encrypted ID token to the server and the server reports success at step 207. In one embodiment requests from an inquiring device contain a server field so that a client may have flexibility to use more than one client code with each code handled by a separate server and associated with different information about the client.

Figure 3:
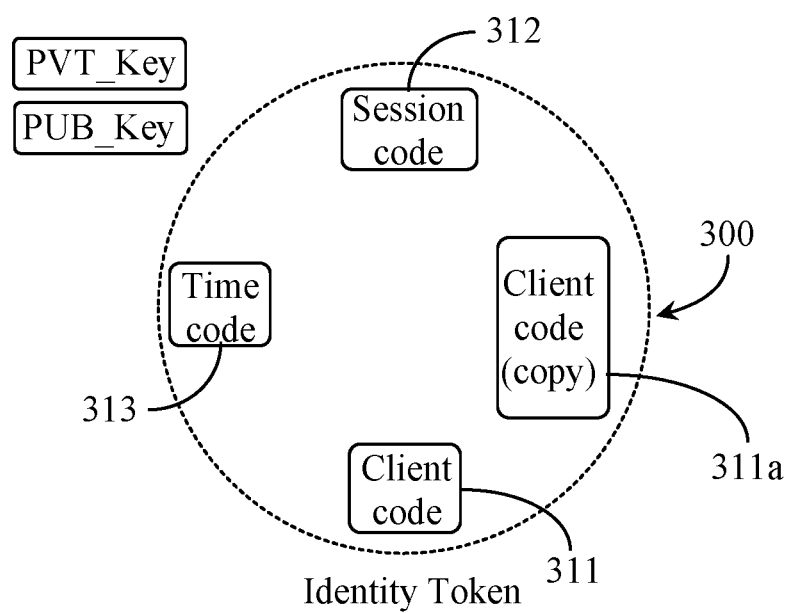
FIG. 3 is a block diagram showing an example embodiment of an encrypted identity token used with a system consistent with the principles of the invention.

FIG. 3: An Example Embodiment of the Encrypted Identity Token Components at the Client Device and the Server FIG. 3 is a block diagram illustrating ID token sharing between the server and a client device. Before using the service of the invention for the first time, a user 112 must register for service and provide authentication data such as a name and pin number or password used to authenticate the client device 110 at the Website. The user may then configure preferences (which may or may not be venue specific) and opt to share certain data such as profile, identity or preference information for one or more participating party hosting the inquiring device. This party may be referred to as a "host". An example of a host might include a retail store or other business or organization having a place of business where the inquiring device is located. The client device then creates a unique and encrypted security token to use during active service.

It is noted herein that reference will be made to asynchronous encryption wherein a key used to encrypt data is held separately from but is mathematically linked to a key used to decrypt the data. Therefore, a key pair comprising a public key and a private key is observed wherein the public key represents part of the pair that is given to a second party and wherein the private key stays on the client device and is kept secret. In "symmetric" encryption a same key may be used to encrypt and decrypt a message or file.

In this example and as depicted by FIG. 3, the client device 110 encrypts a token 300 that includes token data having one or more of a client code 311 which identifies the client device, a session code 312 which identifies the inquirer device that will forward the token to the server, and a time code 313 which makes each token unique.

The client code 311 is a code that uniquely identifies the client device 110 to the server 141 and may be issued by the server. This client code 311 may, for example, be a unique number or portion of code that is generated randomly by the server. The client code 311, may alternatively be a unique number that is built into the client device upon manufacture. The session code 312 is a unique code which is provided to each inquiring device by the server. The session code is how the server determines which inquirer has forwarded a token from the client device. The session code is sent to the client device 110 by the inquiring device to be included in the token with the time code and the client code. The session code identifies the inquiring device that requested the token from the client device. Inclusion of a session code within the token prevents a hacker from spoofing a client device by recording a token that was requested by a first inquiring device at one location and sending it to the server from a second inquiring device a different location thus making the client device appear to be at a location that it isn't. The term session code should not be construed as identification of an actual single client/server session as is normally coined in the art. Rather it is a code that may be server assigned to an inquiring device, the code uniquely identifying the inquiring device so it may be calculated at the server whether a particular token actually came to the server from the correct inquiring device.

A time code 313 is created by the client device for each token created by the client device and sent to the server via the inquiring device. The time code represents the time elapsed since the last timer reset command was issued by the server. The time code is created (determined) by client device using the client device time clock. The time code created (determined) by the client device is sent to the server via the inquiring device and is compared to a time code determined by the server using the server time clock. The server compares the time code received from the client device and its own calculation of the elapsed time since authentication or reset of the client device and determines (or estimates) the network latency. At the time of the initiation (or reset) of the client device with the server the client device time clock and a server time clock may be synchronized. While one will appreciate that while only the inclusion of the client code in the token is essential to the process of identifying the client device, the inclusion of both the session code and time code in the token significantly enhance the security of the system.

A protocol may be associated with a time code generation function on the client device that resets the client device time clock while also allowing the server to estimate the network latency. The time code makes each token unique, and the network latency is determined by the server a result of comparing the time code provided on the token by the client device and the server time clock at a time of receiving the token. The server may predefine a "time window" during which a time code may be considered valid and may thus prevent or usurp interception and delay of issued tokens. For example, the predetermined time window might be two seconds and the network latency calculated by the server is determined as 1 second and therefore the token is determined to have arrived within an acceptable latency period. In this way, the system may prevent a hacker from usurping the system by recording and then replaying an identity token in an attempt to successfully imitate the client device.

In this example, the token 300 includes the three codes: a) the client code 311 which it received from the server at set up (FIG. 2), the session code 312 which the client received from the inquiring device upon request for identity token, and c) the time code 313 determined by the client device at initialization or upon server request for reset.

Referring now back to FIG. 3, the client device encrypts a copy of the client code 311a, that was not previously encrypted using a private key. This copy (311a) is encrypted only with the server public key. The copy of the client code 311a is included in the token to allow the server to find the client's data more efficiently. More particularly, the components may be first encrypted with the client's private key and the server's public key, the copy of the client key added and the entire identity code then encrypted with the server public key enabling the server to identify the client on first pass in decryption whereby the client is identified before the rest of the token is decrypted. The server may then look up the client's public key to decrypt the remainder of the token for validation purposes.

It should be noted that the server issuing a unique client code to each client device is one aspect, or embodiment, of the invention. In an alternative embodiment, the client code may be a unique client number which is made part of the client device during manufacture of the client device. Rather than creating the client code at the server, the server obtains the unique client code from the client device during set up which is then encrypted and stored in the server database.

Figure 4:
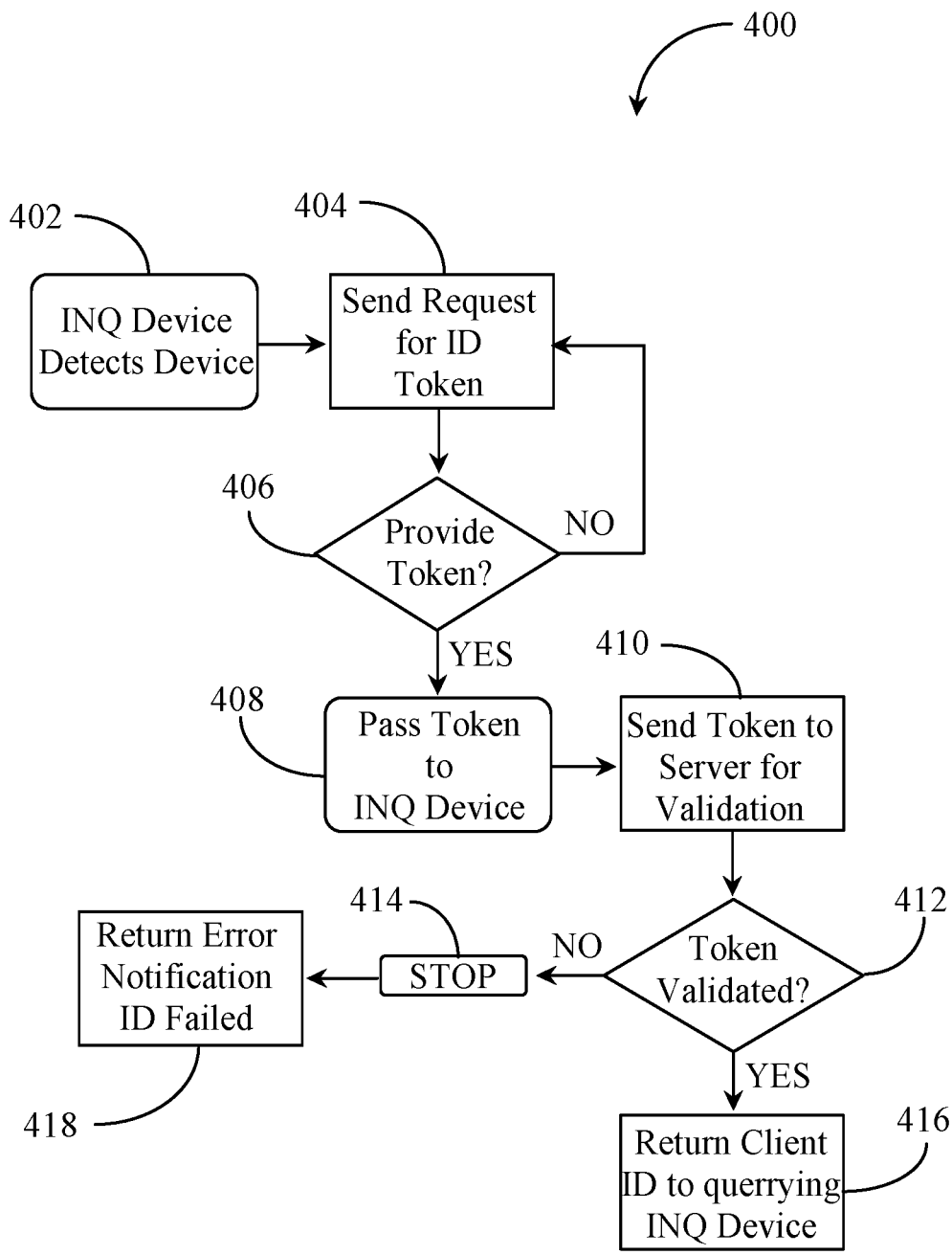
FIG. 4 is a flow diagram of an example process for identifying a user using a system consistent with the principles of the present invention.

FIG. 4 An Example Process for Identifying a User using the System

FIG. 4 is a process flow chart 400 depicting steps for detecting a client device and identifying the user according to an aspect of the present invention. A user registers for a service such as described further above with respect to a service provided by a service provider entity 130 of FIG. 1. Once registered and after the token components are received by the client device from the server, the user is ready to use the service.

In step 402 the inquiring device analogous to device 128 of FIG. 1 detects the client device analogous to device 110 of FIG. 1.

Detection of the client device may require that the client device is powered on and the wireless communications function is activated or on. Detection may be over NFC, WUSB, Bluetooth™, or another wireless network. When a client device is detected, the inquiring device may request the ID token held on the client device at step 404. In one aspect the act of detection and token request may be performed in a single act provided that the client device is in transmission range of the inquiring device. It is noted herein that different wireless protocols may have differing ranges relative to how close a device must be to the requesting device to pass a file to the receiving device. In NFC the devices must be brought close together such as under an inch apart. Bluetooth™ allows for the detected device to transfer a file from further away. It is duly noted herein that there may be a router or hub associated with the local wireless network that may cover a larger space within which client devices may be interacted with. In the case of NFC, it would be a direct transfer from device to device with no router.

In one aspect of flow 400 the user may have an option to cause the client device to deny a token request from the inquiring device. The user may, for example, configure the client device at the time the client device is connected with the server or by use of interface directly with the client device, to allow the client device to deny requests for tokens from certain inquiring devices or during certain time frames. Therefore a client device may decide at step 406 whether or not to provide a token to the inquiring device. If the client device determines not to provide a token at step 406 the process may resolve back to step 404 where another request may be sent by the inquiring device to the client device. In one aspect, a user may purposely have his or her client device powered off or disabled for wireless transmission when in the vicinity of the inquiring device as a passive option out of interacting with the operators of the venue. In another aspect a user may cause the client device to simply ignore repeated requests from the inquiring device.

If it is determined that the client device will provide a token at step 406, the client device may then pass the ID token file to the inquiring device at step 408 through outer or directly depending on the wireless protocol employed. In one embodiment the server issues a session code to the inquiring device when a client device is detected. In another embodiment the server issues a session code to the inquiring device at regular intervals or upon connection of the inquiring device with the server network. In one embodiment, the session code remains the same for multiple client devices, as the session it refers to is established between the server and inquiring device. The inquiring device passes the unique session code to the client device when the inquiring device requests a token from the client device. The client device may then encrypt and insert the session code into the token before the client device passes the token to the inquiring device to be forwarded to the server. In this way the server can validate the session code and also know which inquiring device should be receiving the identity validation and any other data (user information, identity information, preference information) about the user.

It is assumed in this case that the inquiring device successfully receives the token from the client device and sends or forwards the received token to a network server (the server that issued the session code) analogous to server 141 of FIG. 1 at step 410. The inquiring device depends upon the network server to obtain identification information of the user and obtain any other information the user has given permission for that inquiring device to have. Any attacker attempting to mimic the client device would not be able to produce the session code that matches the one in the token. In one embodiment a user may not wish that preference data be sent to another device. Optionally, a user may allow data to be shared to specific ones of router connected devices or to any router connected device without departing from the spirit and scope of the present invention.

It is assumed that the server receives the token from the inquiring device and proceeds to validate the identity token at step 412. In accordance with the encryption and decryption protocol used by the server and client device, the server performs a decryption operation on the received token and checks previously held security token data to attempt to match the data in the received token file with the data in the token version held at the server that was previously transmitted to the server from the client device during the registration process.

At step 412 the server determines if the received ID token matches the ID token held in storage for the particular client device. If all or a portion of the token does not match the server-copy of the token data then the process terminates or stops at step 414. The server may return a notification of error or failure in identifying the user (or specifically, the client device) to the inquiring device at step 418. In one aspect if a received token is not validated, a notification may also be sent to the client's device from the inquiring device or from the server to the client's device or a proxy device connected with the client's device at some point in time after failure notification is sent by the server to the inquiring device.

If the identification token is validated at step 412, the server returns at least the user identification information to the inquiring device in step 416 so that the user may be recognized by the host of the inquiring device (host). Such identification information could include biometric data captured by the BCD (biometric captiie device) of FIG. 1, such as photograph or fingerprint which can be matched with the user by the inquiring device or, alternatively, biometric data (photograph, fingerprint, retinal scan, etc.) may be uploaded by the inquiring device to the server at the time the token is validated so that the server can match the received biometric data to biometric data held in storage for the user associated with the client device. In one aspect the server may also automatically send specifically sorted profile and preference data to the inquiring device, which the inquiring device may use or may route to another local destination point in the same venue. In actual practice, the client token is a three-part security code containing a client code (unique to client device), a session code (generated for each session between the inquirer and the server), and a time code reflecting the time elapsed since the last time reset command was issued by the server. More detail about the token encryption/decryption process exemplified in this embodiment is provided later in this specification.

Figure 5:
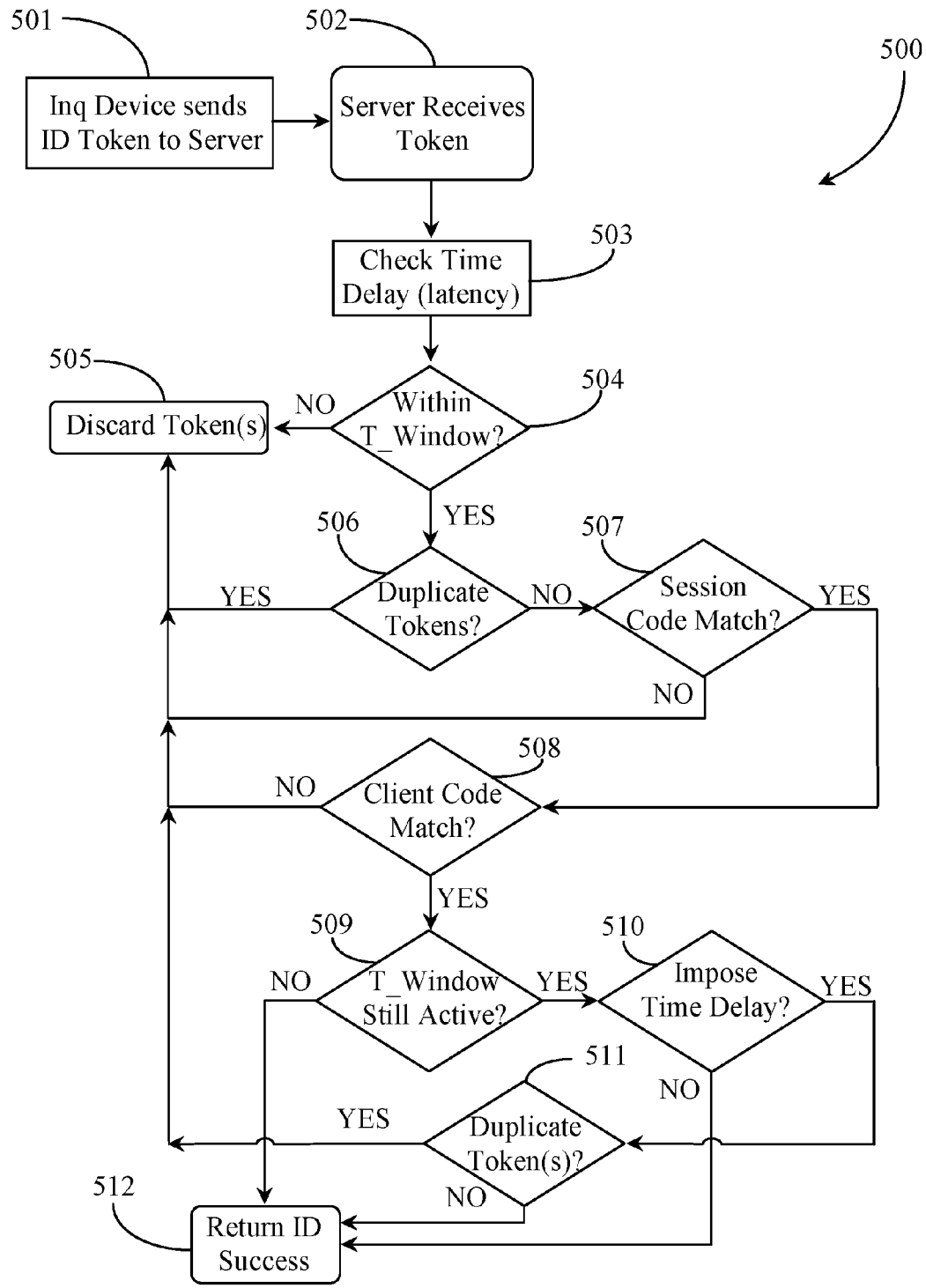
FIG. 5 is a flow diagram showing an example process for validating an identity token using a system consistent with the principles of the present invention.

FIG. 5 Method for Validating Authenticity of an Identify Token

FIG. 5 is a process flow chart 500 depicting steps for validating the authenticity of an identity token according to an aspect of the invention. At step 501 the inquiring device sends an ID token obtained from a client device to a server analogous to server 141 of FIG. 1. The token is taken from the client device by request after detecting the client device within the wireless communications range of the inquiring device.

At step 502 the server receives the token from the inquiring device. Optionally the server may note the time latency (time it took for the token to be transmitted from the client device to the server) at step 503 and check in step 504 to see if the token was received within a predetermined time window (called an "arrival window" in FIG. 5) which may be, for example, the latency calculation determined by comparing the time code sent by the client device and the arrival time as determined by the server which latency calculation may take into consideration an "allowed drift" between a client clock and the server clock. Assuming reauthorization of the client device every 24 hours, a maximum allowable drift might be, for example, 864 mS. While the "arrival window" can be variable, its purpose is to help alleviate risk and thus it is a time period during which a nonfraudulent token is likely to arrive at the server. An example calculation of the earliest allowed time for receipt of a token is the server time minus drift minus mean latency minus 2 standard deviations. An example calculation of the latest allowed time for receipt of a token is the server time plus drift plus mean latency plus 2 standard deviations. So, assuming 24 hours between authorizations of the client device, the start of the window might be −864+10−6=−868 mS whereas the end of the window might be 864+6=880 mS. If at step 504 the token was not received within the prescribed or estimated time window then the process skips to step 505 and the token or tokens, if more than one are discarded. It should be noted that in the event of a hack attempt, multiple tokens (representing multiple attempts by the hacker to get the server to accept a duplicate or fraudulent token) may be received by the server from one or multiple inquiring devices or from other devices connected with the server through the communication network. If at step 504 the token was received by the server within the allotted time window ("arrival window"), then the server may determine if more than one token (duplicate tokens) purporting to be from a specific client device and sent through the inquiring device were received.

If at step 506 more than one token copy or duplicate is received, the process moves to step 505 and all the tokens are discarded. If at step 504 no duplicate tokens were detected then the process moves to step 507 where the server decrypts the token and attempts to match the session code portion of the token to the session code on file at the server. If at step 507 the session code does not match then the process skips to step 505 and all tokens are discarded that were purportedly received from the inquiring device alleged being from the detected client. If the session code matches at step 507 then the server attempts to match the client code and makes a decision at step 508 whether or not the client code matches the client code on file for the particular client device associated with an authorized (i.e. subscribing or member) user and initialized by the system.

If at step 508 the client code does not match the client code on file with the server then the process moves to step 505 and all of the tokens are discarded. If the client code matches at step 508 the server may determine if the "arrival window" is still active for the client device at step 509. If the arrival window has expired the server may return ID verification success to the inquiring device at step 512. If the server determines that an arrival window is still active and not expired the server may determine whether or not to impose a delay in service equaling roughly the rest of the time in the "arrival window". This is to make sure that no duplicate tokens are received within the "arrival window" which may indicate a potential hacking attempt. It should be noted that the client code is repeated in the identity token, once encrypted by both client device private key and server public key, and once only by the server public key. The duplication of the client code allows the server to determine the client identity using only its own private key, and then use this information to look up the client public key in its database with which to decrypt the rest of the identity token. The client code is repeated in the part of the identify token encrypted with the client device's private key to allow it to be checked,and only the client code encrypted by the client device private key is accepted as proof of identity.

If the server decides not to impose a further time delay in response at step 510, the server may return ID success notification to the inquiring device at step 512. If the server decides to impose the time delay at step 510, the server may check to see if any tokens purporting to be from the client and sent through the inquiring device have arrived during the imposed delay in response. If the server detects duplicate token or tokens at step 511 the process may skip to step 505 where all of the tokens are discarded. If no duplicate tokens are detected by the server during the time delay then the server may return ID success notification to the inquiring device. In this way, as previously mentioned above, the server may mitigate any hacking attempts associated with hackers attempting to duplicate or fraudulently recreate matching ID tokens. The process allows for checking of duplicate tokens before and during the matching steps. If the server discards all of the tokens at step 505, there may be a notification to the client in addition to the inquiring device, the notification requesting a direct transaction between the server and the user to re-establish token credentials between the service and client device. In other words, the server may notify the inquiring device and/or the client device that the identification process has failed and request that the client device be re-authenticated.

Figure 6:
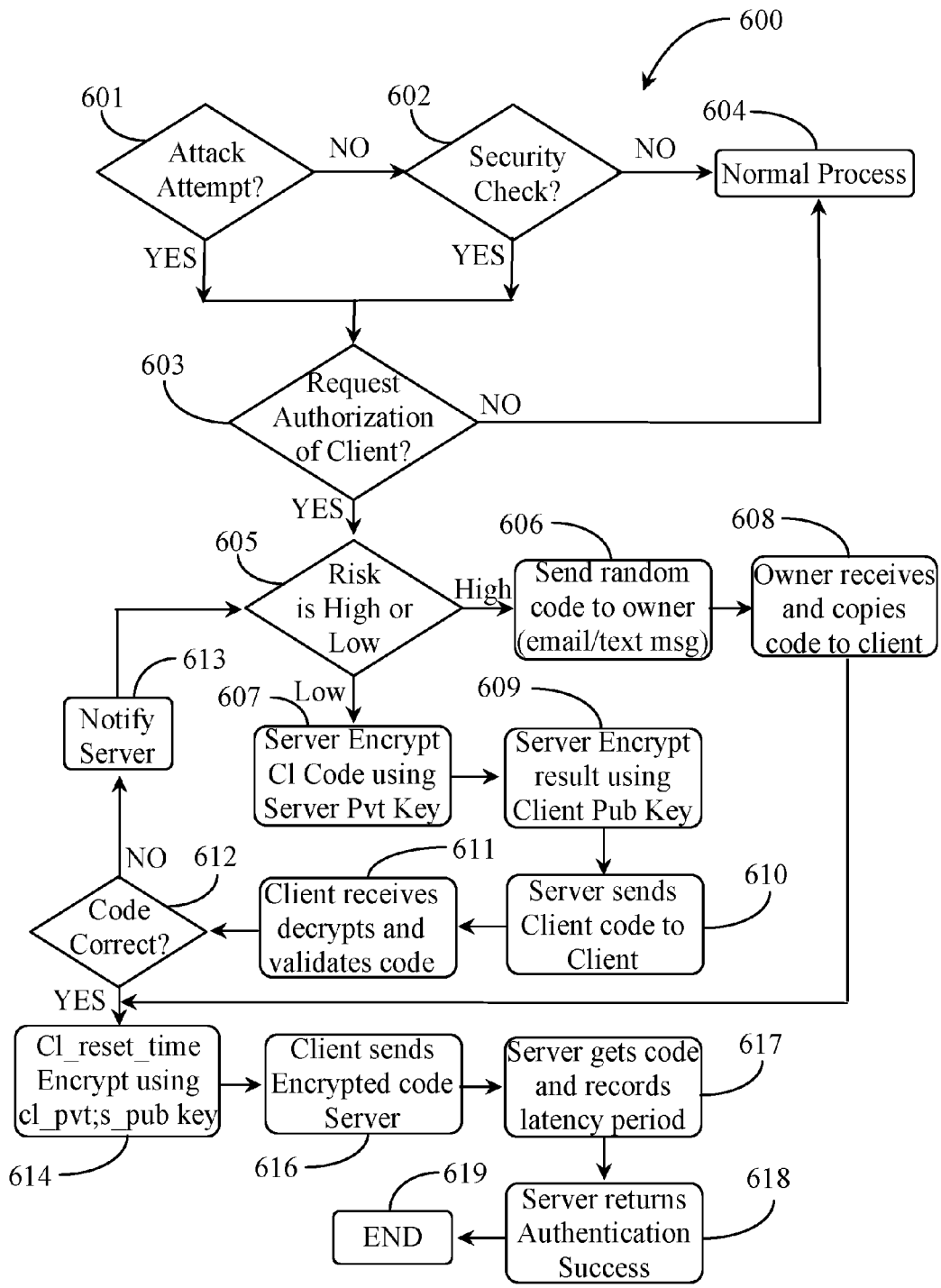
FIG. 6 is a flow diagram showing an example process for re-authenticating a client device using a system consistent with the principles of the present invention.

FIG. 6 Process for Re-Authenticating a Client Device.

FIG. 6 is a process flow chart 600 depicting steps for re-authenticating a client device with a new client code according to an aspect of the present invention. A user practicing the service of the invention may be asked by the service to re-authenticate the client device by communicating directly with the server to create a new identification token. In one aspect the server may determine in step 601 whether or not an attack on the system relative to the user was detected. Such an attempt may involve an attacker attempting to impersonate a client device or user to the service. The server could detect an attempt to impersonate the client device, for example, by analysis of the received tokens (see FIG. 5). The server could detect an attempt to impersonate the user, for example, if biometric information provided by the inquiring device cannot be matched with biometric information held on file. If at step 601 it is determined that no attack attempt was detected, the server may determine at step 602 if a periodic re-authentication interval or check as a result of security policy is warranted or scheduled. If no scheduled re-authentication event is pending then the process may resolve to step 604 and continue under normal process conditions including identifying and sharing preference and certain profile or personal information to authorized recipient devices given prior permissions by the user of the client device having connection to the inquiring device.

If an attack attempt was detected by the server in step 601 and or if a periodic re-authentication check is warranted at step 602, then the server may determine based on that data whether or not to request re-authentication of the client at step 603. In one embodiment this request might be sent to a user who has attempted to use the service and whose associated client device has submitted a token to an inquiring device that was uploaded to the server for validation. If the server determines not to request re-authentication of the client device in step 603, then the process may progress to step 604 and normal processing. There may be one or more conditions that might temporarily override server activity dedicated to re-authentication giving the server option not to impose re-authentication at the instant time.

If the server determines to request re-authentication of a client device at step 603, the server may determine whether the current security risk is high or low and take appropriate steps. Risk comes from a combination of the general confidence in client identity (for example, how long since the client device has been re-authorized) and potential consequence of failing to correctly identify the user. An example of what might be a high risk is when the client device has not been re-authorized for some time and the identification information is being used for payment purposes (for example, credit card information is being provided). An example of what might be considered low risk is when the client device has been recently re-authorized and the information to returned from the server to inquiring device is to be used for advertising to the user. There are two branches of process flow 600 that may be observed by the server based on its risk level determination at step 605. Generally speaking, re-authenticating the client requires that the client device be connected with the server directly or through a proxy device and reconfigure security credentials for generating a new token overwriting the most recent token(s) used.

If the server determines a low risk at step 605, the process may move to step 607 wherein the server may encrypt the current client code using the servers private encryption key. The server may then encrypt the result of the encryption act of step 607 using the client's public key at step 609. At step 610 the server sends the doubly encrypted client code to the client device or a connected proxy device that is in turn connected to the client device and can load (for example, upload or manually load using a key pad or other user interface) the client code onto the client device. The client device may receive the client code, decrypt the code, and validate the code against what the client device has stored in device memory.

At step 612, the client device or proxy device may determine locally if the decrypted client code is the correct code. If it is determined that the code is correct, the client device may reset its time code and encrypt the client code with the client device's private key and then the result with the server's public key in step 614. At step 616 the client device may send the encrypted client code back to the server. At step 617 the server may receive the code and may record the latency period time from the reset time code to the time of receipt of the encrypted code in step 617. At step 618 the server may return authentication success notification to the client device or connected proxy device. The process may end for re-authentication at step 619.

In the event that the server determines that the risk is high in step 605 then the server may generate a new client code and send the code to the owner of the client device through a trusted communications channel such as registered email or in a secure text message in step 606. At step 608 the owner may receive at a proxy device (laptop, smartphone, etc.) the message and may copy the code to the connected client device. It is noted that in one embodiment the client device is fully capable of network navigation including input and display components. The process resolves back to step 614 and may continua normally through steps 616 through 619. In both process branches the client device is assumed to be connected directly to the server or through a proxy device like an android device, smartphone, laptop, tablet or other such device.

In the event that security is compromised and a client code becomes known, the server may generate a new client code and re-authenticate the client as described further above. In an example embodiment of the system and method, each client device holds its client codes and encryption keys in memory that is itself encrypted, the key for which may be inserted into the client device when it is manufactured, or may be generated randomly. If the client device encryption key is generated randomly by the client device, the client device encryption key would need to be re-authenticated if the client device loses power. But utilizing a randomly generated encryption key would make it significantly harder to steal the data by simply inspecting the client device.

Detection of Multiple Associated Users to Increase Confident of User Identity

It will be appreciated that the system and methods described above allow the system to detect multiple users within a particular geographic location (premises of the host of the inquiring device) at essentially the same time. In one embodiment, the server may verify the identities of multiple associated users—that is users known to the system as being related or otherwise confidents/friends or known to the system to be likely to be in the same geographical place at the same time. For example, known associated users may be users who are members of a class or group that is normally scheduled to appear at a certain place at a certain time. The associations may be known to the system (server) because the users themselves provide that information in their profile or identifying information at registration. Or, alternatively, the CIS server my obtain that information from other sources such as meta data from third parties regarding phone conversations between users, friends on social media sites (such Facebook and others for example) or by way of gathering and analyzing historical data regarding the detected presence of users by inquiring devices over time through the system. For example, the system may record the instances when two or more users are identified by the system and associate those two or more users (i.e. determine that the two or more user are likely to be near one another at the time of identification). While they may not be formally associated by the users themselves, the system (server) may use the historical data to determine that the users are associated with one another in practice. The system may then use this information to analyze the confidence in the identity of a user detected to be in a certain place at a certain time. For example, the system may detect a user and one or more associated users to be at a host venue (store, classroom) at a certain time and, based on the detection of the associated users, determine that the user is more likely to be the user he or she purports to be because the associated users are also present. Likewise, the system may detect the presence and attempt to verify a user at a location and determine based on the lack of known associated users being detected at that venue at that time that there is a higher risk that the user is not who they purport to be and therefore run a protocol requiring reauthorization or require the steps during the token matching process (described above) which would be appropriate for a high risk situation.

Detection and analysis of associations between users has significant practical value particularly in the situation where the user to be identified is carrying the client device with them but, for some reason, is unwilling or unable to function such to allow the system to verify the user using biometrics or passwords. For example, if a person who is debilitated (covered with bandages or otherwise unable to talk or move) is brought to the hospital by a known associate, the user to be identified might be carrying or wearing a client device but otherwise unable to participate in biometric verification or respond to requests for password verification. In that instance, if a known associate is detected as being with the user, the system may allow verification of the user when it otherwise may not because of the inability of the user to provide information. In another example, if such debilitated user normally shows up to hospital with a known associated user and the system detects that the associated user is not present, the system could trigger further action (such as to cause a notification to be sent to the known associate) to help verify the user's identity.

It may be appreciated that the associations between users may be controlled, at least in part, by the user during the set up process or by way of the user access his or her profile and choosing options whereby they allow the system to use associations (either created by the user directly or determined by information provided the server from third parties (Facebook, phone records received from mobile phone service providers, etc.).

Use of the System to Provide Verifying Data Directly to Client and Update Verification Data of Users As the use of wireless technology prevents the precise position of the client device from being known, it may not be possible to isolate one user from another in, for example, a queue in a shop. Under such circumstances the identity token may confirm that a client device (i.e. user carrying a client device) having a particular identity is close and, if for example the user has authorized the server to supply a photograph of the user to the inquirer, such photograph may be displayed by the client device to help confirm the identity of the user. Furthermore, in another example embodiment, the inquiring device may then use face recognition processing to associate the photograph with a nearby person. In another example embodiment, the photograph supplied by the server may be replaced or updated by face recognition data generated by off-line processing of one or more photographs that assists in automatically recognizing the user to be identified. In another example, once the verification of the user is established by the system using the processed described above, a new photograph of the identified user may be taken and uploaded to the server to be stored for purposes of updating the facial characteristics of the use. Such updates may be automatic or may be controlled by the user through modification of profile and preferences at the server. Such modification or updates are useful in the context of facial recognition where facial hair, scarring or other changes in the facial characteristics of the user render it difficult for the server or inquirer to provide accurate face recognition through matching with outdated photographs. The same process could be used for updating other biometric information of the user. Fingerprints may be altered because of injury for example and need to be updated in order to allow continued use of biometric verification.

Use by the System of Measures of Confidence in User Identity

The identifying information sent to the inquiring device may include an indication of the confidence the server has that the client is who it claims to be. The term "measure of confidence" indicates the certainty with which the principal has been identified by the server, where confidence is a numerical value determined by the stringency and number of tests applied. Different circumstances may call for higher or lower levels of confidence, for example authorization of payment may require a higher measure of confidence than identification for the purpose of advertising. The level of confidence in the identification may be derived from several factors including an analysis of the places the user has recently been (including time information) allowing a check (i.e. calculation) to determine whether the client's movement between these places would be practical within the recorded time period. The check may also include a measure of how often the user (of course, with client device) is in that area, at that time, on that day of the week. The values from multiple measures of confidence may be combined into a single value, and therefore measures of confidence may be described as a single measure. For example, the reauthorization of a client device within the last month may provide a value for the measure of confidence as 5. In contrast, the reauthorization of a client device within a longer time period (the last year for example) may be given a value for the measure of confidence as 2. A confirmation of user identification using facial recognition may, for example, be given a confidence value of 3 while a confirmation of the user's identity using a password (which is less certain) may be given the value of 2. These measures of confidence values may be averaged or otherwise combined into a single value representing a measure of confidence.

Measures of confidence in a user's identity may, as previously discussed, be affected by the presence of known associates. The detection and consideration of their presence would increase the likelihood that the user is as claimed. Again, these associates may be explicitly declared by the user, or may be determined by analysis of other clients often found physically close to the user.

Measures of confidence may be affected by biometric verification. For example, face recognition may also be used to increase confidence in the identity of a principal. In one example, face recognition is performed by the inquirer using biometric data recorded on and supplied by the server. Having detected the users client device, the inquiring device may inform the server of a successful identification so increasing the server's confidence in the users identity. In another example, the inquirer uses face recognition to isolate the face of the principal from a wider image containing other faces, and then submit it to the server for additional verification. As stated previously, the server may apply its own recognition and also use the new image to update or improve the biometric data associated with the principal. In another example embodiment, the inquirer does no recognition and instead supplies untested images to the server for analysis.

Use of Direct Connection between Client Device and Inquiring Device

In an embodiment of a system and method consistent with the principles of the invention, the inquiring device may not connect to a remote server and may instead make direct use of the identity token, becoming both the inquiring device and server. For example, the inquiring device may be a computer that logs-in the user when the user's associated client device is detected as being in close proximity to the inquiring device. In a related embodiment the inquiring device and the server are portable and carried by the user. For example, an embodiment of the system may be in the form of a car and user holding a wearable device. The car holds a secure client device. Both the inquiring device and the server are housed in the wearable device (such as a watch or smart phone). In a first step, the client device (i.e the car) responds to a request for identity from an inquirer/server (the watch) worn by the user by returning an identity token to the inquirer/server. In other words, the inquiring device (the watch) detects the presence of the client device (the car) and request an identify token. The client device (the car) returns the identity token to the inquirer/server (the watch) which recognizes the identity token returned by the client device and identifying information (i.e. personal information) stored by the inquirer/server (the watch) is sent from the inquirer/server to the client device (the car) allowing or initiating the client device (in this case a car) to move seats to appropriate (or preferred) positions, adjust the mirrors, and/or tune the radio to a preferred station in accordance with the preference information contained in the identifying information (or data).

In another example embodiment, the inquiring device may be the principal's computer. After authenticated the presence of the user, the inquiring device may use the identifying information received from the server to automatically log-in to websites on behalf of the user. In another example embodiment, a remote website may function as the inquiring device and the users computer may act as an intermediary between the client device and the inquiring device, passing the inquiring device's request for an identity token to the client device and sending client device's reply (i.e. identity token) to the inquiring device. Once the inquiring device receives the reply (i.e. identity token) from the client device, the inquiring device (the website) may then contact the server directly for the user's identifying information.

From the above it should be clear that the client device has passed its identity (i.e. identity token) to the server via the inquiring device and the server has responded by returning identifying information to the inquiring device if the inquiring device is authorized to receive this information. These are all steps of the process being secured by encryption and are initiated automatically as previously discussed. The user's possession of the client device is considered proof of the users identity and to ensure this is true it is preferable that the client device is built in to a form or other device that is wearable or otherwise unlikely to be lost or stolen or otherwise easily separated from the user, such as a wristwatch.

Functions, operations, components and/or features described herein with reference to one or more embodiments may be combined with, or may be utilized in combination with, one or more other functions, operations, components and/or features described herein with reference to one or more other embodiments, or vice versa.

It will be apparent to one with skill in the art that the identification and information retrieval system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught There may be many alterations made in the descriptions without departing from the spirit and scope of the present invention.

The invention claimed is:

1. An identity confirmation system and service provided by a computerized server connected to a wide area network (WAN) storing and executing software from memory, comprising:
    an interface, accessible on the WAN, provided by the software at the server, enabling a user to register for service with the server;
    a computerized client device carried by a user and enabled to connect to the WAN, the client device including transmission and receiving hardware enabling wireless communication, the client device storing and executing an instance of the software from memory;
    a computerized inquiring device connected to the WAN including transmission and receiving hardware enabling wireless communication, the inquiring device storing and executing an instance of the software from memory, the inquiring device hosted by a party separate from the client device;
    an identification token having a session code identifying the inquiring device to the server, time code and client code; and
    a database accessible to the server storing identity tokens, profile data and preferences of the user;
    wherein, upon initial access by the client device to the server via the interface, the client code is generated by the server and sent to the client device which uses the client code to generate the identification token which is sent back to the server and upon the client device coming within geographic proximity enabling wireless communication with the inquiring device, the inquiring device requests the token from the client device, the client device updates the time code and sends the token to the inquiring device, the inquiring device receives the token and updates the session token, forwards the token to the server which analyzes and validates identity of the user and client device forwarding the stored profile information to the inquiring device.

2. The system of claim 1 wherein the token is encrypted in the initial communication with asymmetric encryption between the client device and the server.

3. The system of claim 2, wherein the client device encrypts the session code, time code and client code of the identification token with a private key and sends it corresponding public key to the server, the server using the server's public key to encrypt the client code, time code and session code and the server encrypting a copy of the client code with the server's public key before sending the identification token back to the client device.

4. The system of claim 1, wherein the inquiring device utilizes the profile data received from the server to confirm identification of the user and facilitate transactions with the user.

5. The system of claim 4 wherein the users profile and preferences data includes any one or more of the user's name, age, address, gender description, family members, choices regarding inquiring devices that the user wishes to provide or deny information to, general preferences regarding music, literature, food and sport, user identifying information, historical data involving user's contact with the system, data collected from third party servers about the user.

6. A method for providing an identity confirmation system and service provided by a computerized server connected to a wide area network (WAN) storing and executing software from memory, comprising the steps of: (a) initially connecting to the sever, via the WAN, a computerized client device carried by a user, the client device including transmission and receiving hardware enabling wireless communication, the client device storing and executing an instance of the software from memory;
    (b) generating a client code by the software at the server and sending it to the client device;
    (c) receiving the client code at the client device and generating an identification token by an instance of the software at the client device, the identification token including the client code, a session code and a time code;
    (d) encrypting the identification token by the client device and sending it back to the server, wherein the server validates identification of the user via comparing at least the client code;
    (e) requesting the identification token from the client device, via wireless communication, by a computerized inquiring device, the client device being in a geographic proximity enabling the wireless communication;
    (f) updating the time code in the identification token by the client device and sending the token to the inquiring device which updates the session code and forwards the identification token to the server; and
    (g) receiving the identification token at the server which analyzes the client code, session code and time code and validates identity of the user and client device forwarding stored profile information of the user to the inquiring device.

7. The method of claim 6, wherein the token is encrypted in steps (b) thru (d) with asymmetric encryption between the client device and the server.

8. The method of claim 7, wherein the client device encrypts the tine code, client code and session code of the identification token with a private key and sends its corresponding public key to the server, the server using the server's public key to encrypt the client code, time code and session code and the server encrypting a copy of the client code with only the server's public key before sending the identification token back to the client device enabling the server to quickly decrypt the copy of the client code upon subsequent receipt of the identification token.

9. The method of claim 6, wherein the inquiring device utilizes the profile data received from the server to confirm identification of the user and facilitate transactions with the user.

10. The method of claim 9 wherein the users profile and preferences data includes any one or more of the user's name, age, address, gender description, family members, choices regarding inquiring devices that the user wishes to provide or deny information to, general preferences regarding music, literature, food and sport, user identifying information, historical data involving user's contact with the system, data collected from third party servers about the user.

* * * * *